(12) United States Patent
Stahlfeld et al.

(10) Patent No.: US 11,611,213 B1
(45) Date of Patent: *Mar. 21, 2023

(54) POWER GRID ASSETS PREDICTION USING GENERATIVE ADVERSARIAL NETWORKS

(71) Applicant: X Development LLC, Mountain View, CA (US)

(72) Inventors: Phillip E. Stahlfeld, Mountain View, CA (US); Bin Ni, Fremont, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,505

(22) Filed: Oct. 11, 2021

Related U.S. Application Data

(63) Continuation of application No. 16/573,183, filed on Sep. 17, 2019, now Pat. No. 11,152,785.

(51) Int. Cl.
| | | |
|---|---|---|
| *H02J 3/00* | (2006.01) | |
| *G06N 3/08* | (2006.01) | |
| *G06Q 50/06* | (2012.01) | |
| *G06N 3/084* | (2023.01) | |
| *H02J 3/14* | (2006.01) | |

(52) U.S. Cl.
CPC ............ *H02J 3/0073* (2020.01); *G06N 3/084* (2013.01); *G06Q 50/06* (2013.01); *H02J 3/14* (2013.01); *H02J 2203/20* (2020.01)

(58) Field of Classification Search
None
See application file for complete search history.

(56) References Cited

U.S. PATENT DOCUMENTS

| | | | | |
|---|---|---|---|---|
| 8,805,598 | B2 * | 8/2014 | Shaffer | H02H 7/30 700/297 |
| 2013/0024043 | A1 * | 1/2013 | Shaffer | H02H 7/30 700/297 |
| 2013/0091258 | A1 * | 4/2013 | Shaffer | H02J 3/00 709/224 |
| 2013/0310093 | A1 * | 11/2013 | Giannakis | H04W 24/02 455/501 |
| 2017/0358914 | A1 * | 12/2017 | Chaiquin | H02H 7/28 |
| 2019/0138847 | A1 * | 5/2019 | Shor | G06K 9/6273 |
| 2019/0155284 | A1 * | 5/2019 | Zavesky | G06V 10/764 |

(Continued)

OTHER PUBLICATIONS

Hu et al., "Localization in Aerial Imagery with Grid Maps using LocGAN", Jul. 16, 2019, IEEE. (Year: 2019).*

(Continued)

*Primary Examiner* — Mohammad Ali
*Assistant Examiner* — Kelvin Booker
(74) *Attorney, Agent, or Firm* — Fish & Richardson P.C.

(57) ABSTRACT

Methods, systems, and apparatus, including computer programs encoded on computer storage media, for using a neural network to predict locations of feeders in an electrical power grid. One of the methods includes training a generative adversarial network comprising a generator and a discriminator; and generating, by the generator, from input images, output images with feeder metadata that represents predicted locations of feeder assets, including receiving by the generator a first input image and generating by the generator a corresponding first output image with first feeder data that identifies one or more feeder assets and their respective locations, wherein the one or more feeder assets had not been identified in any input to the generator.

19 Claims, 2 Drawing Sheets

(56) References Cited

U.S. PATENT DOCUMENTS

| | | | |
|---|---|---|---|
| 2019/0288514 A1* | 9/2019 | Shukla | H02J 3/06 |
| 2020/0334577 A1 | 10/2020 | Anderson | |
| 2020/0409347 A1 | 12/2020 | Berry | |
| 2021/0073630 A1 | 3/2021 | Zhang | |
| 2021/0089903 A1 | 3/2021 | Murray | |
| 2021/0124920 A1 | 4/2021 | Stahlfeld | |
| 2021/0141969 A1 | 5/2021 | Stahlfeld | |

OTHER PUBLICATIONS

Ying et al., "Power Message Generation in Smart Grid via Generative Adversarial Network", Mar. 2019, 2019 IEEE 3rd Information Technology,Networking,Electronic and Automation Control Conference (ITNEC 2019). (Year: 2019).*

Yu et al., "Synchrophasor Recovery and Prediction: A Graph-Based Deep Learning Approach", Oct. 2019, IEEE Internet of Things Journal, vol. 6, No. 5, Oct. 2019. (Year: 2019).*

Zhang et al., "Generative Adversarial Network for Synthetic Time Series Data Generation in Smart Grids", 2018, 2018 IEEE International Conference on Communications, Control, and Computing Technologies for Smart Grids (SmartGridComm). (Year: 2018).* bamos.github [online], "Image completion with deep learning in tensorflow," Aug. 9, 2016, retreived on Sep. 11, 2019, retrieved from: URL<http://bamos.github.io/2016/08/09/deep-completion/>, 31 pages.

Hu et al., "Localization in Aerial Imagery with Grid Maps using LocGAN," CoRR, Jul. 2019, arXiv:1906.01540v2, 8 pages.

Li et al., "Sparsely Self-Supervised Generative Adversarial Nets for Radio Frequency Estimation," IEEE Journal on Selected Areas in Commumcations, Nov. 2019, 37(11):2428-2442.

Ying et al., "Power Message Generation in Smart Grid via Generative Adversarial Network," 2019 IEEE 3rd Information Technology, Networking, Electronic and Automation Control Conference, Mar. 2019, pp. 790-793.

Yu et al., "Synchrophasor Recovery and Prediction: A Graph-Based Deep Learning Approach," IEEE Internet of Things Journal, Oct. 2019, 6(5):7348-7359.

Zhang et al., "Generative Adversarial Network for Synthetic Time Series Data Generation in Smart Grids," 2018 IEEE International Conference on Communications, Control, and Computing Technologies for Smart Grids (SmartGridComm), Oct. 2018, 6 pages.

\* cited by examiner

POWER GRID ASSETS PREDICTION USING GENERATIVE ADVERSARIAL NETWORKS

CROSS-REFERENCE TO RELATED APPLICATION

This application is a continuation of U.S. patent application Ser. No. 16/573,183, filed Sep. 17, 2019, the disclosure of which is expressly incorporated herein by reference in its entirety.

BACKGROUND

This specification relates to determining geographical locations of power grid assets.

Power grids contain thousands of miles of wires, millions of poles, and other expensive assets, e.g., transformers, capacitors, and switches. As far as mapping is concerned, one fundamental building block of a grid is called a "feeder." A feeder is the set of assets connecting a group of loads to a substation. For example, one feeder might be used to connect a group of houses on one side of a street to a nearby substation. However, the houses on the other side of the street might be connected to a completely independent feeder. Other kinds of loads can also be connected to substations by feeders, for example, commercial and industrial loads.

Mapping above-ground assets, e.g. wires strung between poles, is a process of identification from aerial or street level images or both. An issue common to such process is that recognition systems are imperfect and detailed images are not available everywhere, so assets will be missing from the mapping and incorrectly identified. Trying to map feeders using such process has further difficulties. The first is that multiple feeders can be run on the same pole and no a good way to differentiate such feeders is presently known. The second is that feeders often have portions that run underground, so an above-ground map will have portions that appear to be isolated from a substation.

SUMMARY

This specification describes technologies for predicting locations of feeders of a power grid from images, which may include one or more of aerial, drone, satellite, or ground level images. Implementations of the technologies use a generative adversarial network to predict entire feeders. There is ground truth data about feeder routes and assets available in limited locations. The generative adversarial network is trained using such ground truth data. The trained network is used to generate complete maps of feeders in locations where ground truth data is not available. In some implementations the prediction includes, for each feeder, all assets from a substation to one or more loads, the feeder including, for example, lines, poles, crossarms, transformers, including the sizes of the transformers, e.g., in KVA (kilovolt amperes), voltage regulators, switches, insulators, reclosers, sectionalizers, capacitor banks, including switched capacitors, load tap changers, and taps, e.g., drops and risers.

The subject matter described in this specification can be implemented in particular embodiments so as to realize one or more of the following advantages. For a variety of reasons, companies running power grids too often do not have good information about where their feeders and other assets are located. The predictive mapping technology described in this specification can accurately and scalably map out a power grid and provide tremendous value to companies operating and maintaining the grid. Of particular value, the technology can map out underground assets.

The technology described in this specification can predict entire feeders, i.e., including all assets from substation to loads. There is ground truth data about feeder routes and assets available in limited locations. This ground truth data, alongside the generated data, is used to train the discriminator, which is then used to train the generator. The trained generator is then be used to generate complete maps of feeders for places where the ground truth data is not available, including locations of underground assets.

A further advantage is that in predicting likely feeder layouts, in some cases the generator can generate a more efficient layout for feeders than what is actually in place. Such predictions could be used by utilities to update their grid configurations to match the predictions and thereby increase efficiency. In some cases, the updates to the grid can be something as simple as moving a large industrial load from one feeder to another by changing the positions of two switches.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
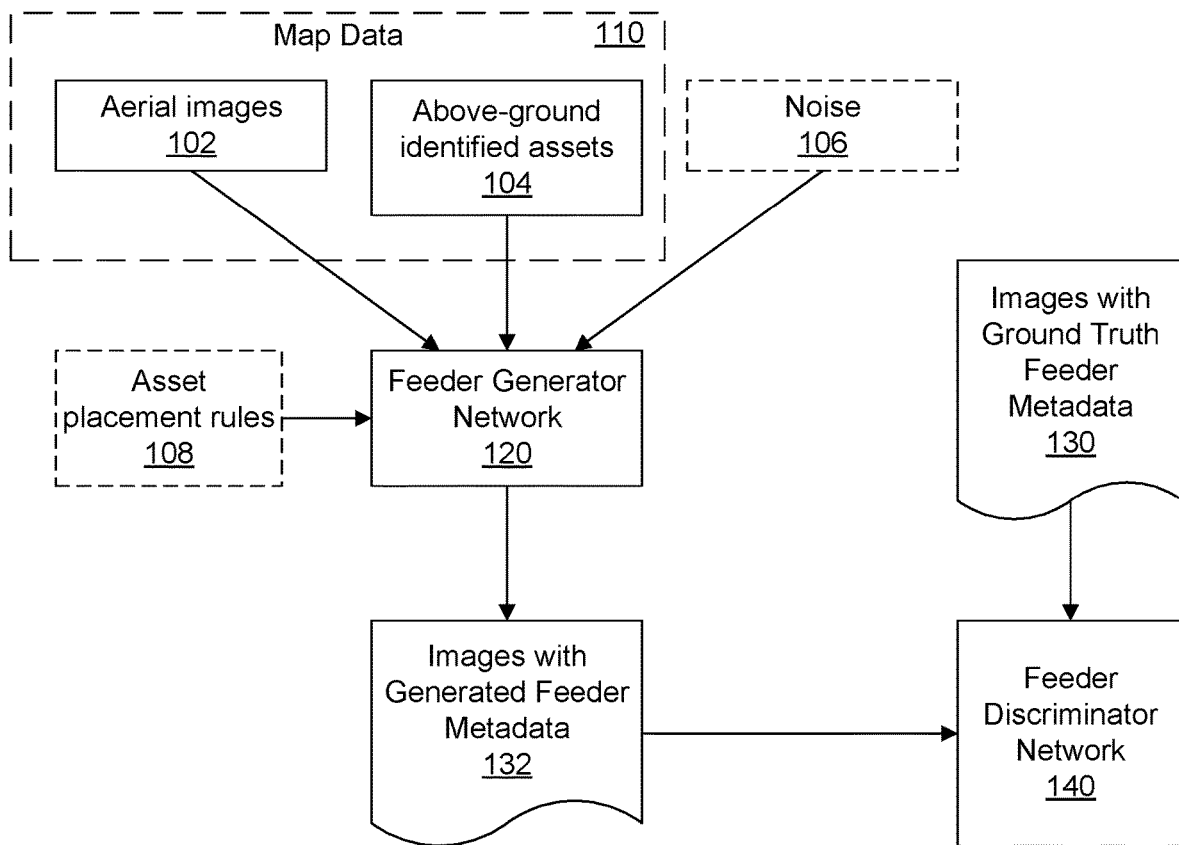
FIG. 1 is a block diagram showing elements of a generative adversarial network in the context of training to predict feeders from aerial images and above-ground identified assets.

FIG. 1 is a block diagram showing elements of a generative adversarial network ("GAN") in the context of training the network to predict feeders from aerial images and above-ground identified assets. The elements include a feeder generator network 120 and a feeder discriminator network 140.

The feeder generator network and feeder discriminator network can be implemented as deep neural network models. They need not, and generally will not, have the same structure. Advantageous neural network structures for these neural networks include deep convolutional neural networks. Advantageously, the GAN is a deep convolutional generative adversarial network ("DCGAN"), and a conditional GAN in which a condition is the input imagery.

The feeder discriminator network is used in training the feeder generator network. During training and in production, the feeder generator network receives as inputs map data 110, including, e.g., aerial images 102, data identifying locations of above-ground assets 104, which will be generally be incomplete and often entirely absent during production but present during training, and, during training, in addition to map data, noise 106. In some implementations, the feeder generator network receives asset placement rules 108, which will be described later in this specification. Map data can include other kinds of useful data as well, in particular, data that cannot be seen in aerial imagery. For example, when it is being trained, the GAN will learn about roads and houses that appear in the imagery. Additional information that can be included in the input map includes the age of the buildings, because buildings built around the same time are more likely to be on the same feeder, which buildings have air conditioning, because it requires a large amount of power, and the type of industry an industrial building belongs to, because that indicates the building's power requirements. The identified assets data and the images include geolocation by which the feeder generator network or a front-end to the feeder generator network can locate the assets on the images. The feeder generator network generates for each input image output map data, and in particular generated feeder metadata 132, which represents predicted locations of feeders, including data identifying assets and their locations. The generated feeder metadata can be overlaid on an input image to show where the predicted feeder and its assets are. The generated map data will in general be the same as the input map data, insofar as it relates to information that can be seen in imagery. The location coordinates could contain an optional elevation term. Wires could be represented by the assets that they connect. A 3-phase power wire would be represented as a single entity; but as phases split off farther along the feeder, each phase is represented as its own entity. The input and output metadata can be embedded in image data or it can be in a separate data entity, e.g., a comma-separated value file, a JSON file, or a protocol buffer. The combination of an image and corresponding feeder metadata, whether or not in a single file, may be called map data or generated map data.

During training, generated map data is input into the feeder discriminator network.

Images including corresponding ground truth feeder metadata 130, which may be called "ground truth feeder images," are another input into the feeder discriminator network during training. Ground truth feeder metadata is ground truth data representing actual locations of feeders, including locations of their assets. Generated and ground truth feeder images are input during training to the feeder discriminator network in batches, which may include both types of images, advantageously half of each type, or only one of the two types.

Aerial images can include, or be associated with, further data that identifies structures that have an effect on where a utility would located feeder assets. Such other structures include, for example, houses, apartments, business offices, and other loads, as well as structures that constrain the locations where a utility can place assets and route feeders, e.g., roads, highways, or rivers.

The ground truth map data can be any kind of map data that the feeder generator network is trained to generate.

In some implementations, the data format of the map data represents nodes and connections in the feeder network, where each node contains its type and location, and the connections specify which nodes are connected to each other.

The goal of training is to train the feeder generator network to generate generated map data, and in particular to do so from aerial images 102, that is indistinguishable from ground truth map data insofar as the locations, connections, and identities of assets are concerned. In production, the input to the feeder generator network includes aerial images, which aerial images are used as a conditioning image for an implementation based on a conditional GAN architecture, for which the feeder generator network will generate feeder metadata data identifying known assets in the areas covered by the images.

The process of training trains the feeder discriminator network to determine whether an feeder metadata is ground truth or not. Correspondingly, the process of training the feeder generator network trains it to create an image with feeder metadata that will fool the feeder discriminator network, i.e., that the feeder discriminator network will categorize as ground truth. In effect, the feeder discriminator network implements a loss function for the feeder generator network. As a result, this generative adversarial network structure and training process has the great advantage that no hand-crafted loss function needs to be created for the feeder generator network. The training data includes ground truth data for all the different kinds of assets that appear on feeders.

The training process alternates between training the generator and training the discriminator. When training the generator, the discriminator is fixed and the generator trains to trick the discriminator. When training the discriminator, the generator is fixed and the discriminator trains to identify the fakes produces by the generator. The process repeats until an end condition occurs, e.g., the engineer managing the training sees overfitting, or an equilibrium is reached between the generator and the discriminator. In this training process, there are two losses—the generator's, when a generated feeder image is detected as a fake, and the discriminator's, when a generated feeder image is accepted or a ground truth image is rejected.

The discriminator will have a set of convolutions and pooling layers applied to the conditioning image to extract features that will then be concatenated with the feeder metadata and passed into a deep classifier to determine whether the feeder metadata is real or generated.

The generator will have a similar set, generally but not necessarily the same, of convolutions and pooling layers applied to the conditioning image and then some combination of up convolutions and deep layers to predict the feeder metadata. One can think of the feeder metadata as being like the output of an object detection network like FasterRCNN. The output of the generator predicts multiple nodes, each with a location, type, and confidence, and multiple connections, each with a confidence, and each between a pair of nodes.

In some implementations, the feeder generator network includes asset placement rules 108. These rules are associates with particular constituents of a feeder. The rules can represented in code that alters a predicted feeder metadata to be compliant with the rules. After the generator generates the feeder metadata, the rule-implementing code is run to make the metadata compliant, and then the compliant metadata is run through the discriminator and back propagation. Example of a rule include: all lines must be connected to a substation, i.e., no islands; a unique path must exist from every point on the feeder back to the substation, i.e., no cycles; a riser must be connected to something else; a residential load must be no more than a maximum distance from a transformer, which distance depends on whether the region is rural, suburban, or urban; a pole must be no more than a maximum distance from another pole or other line-carrying structure.

Figure 2:
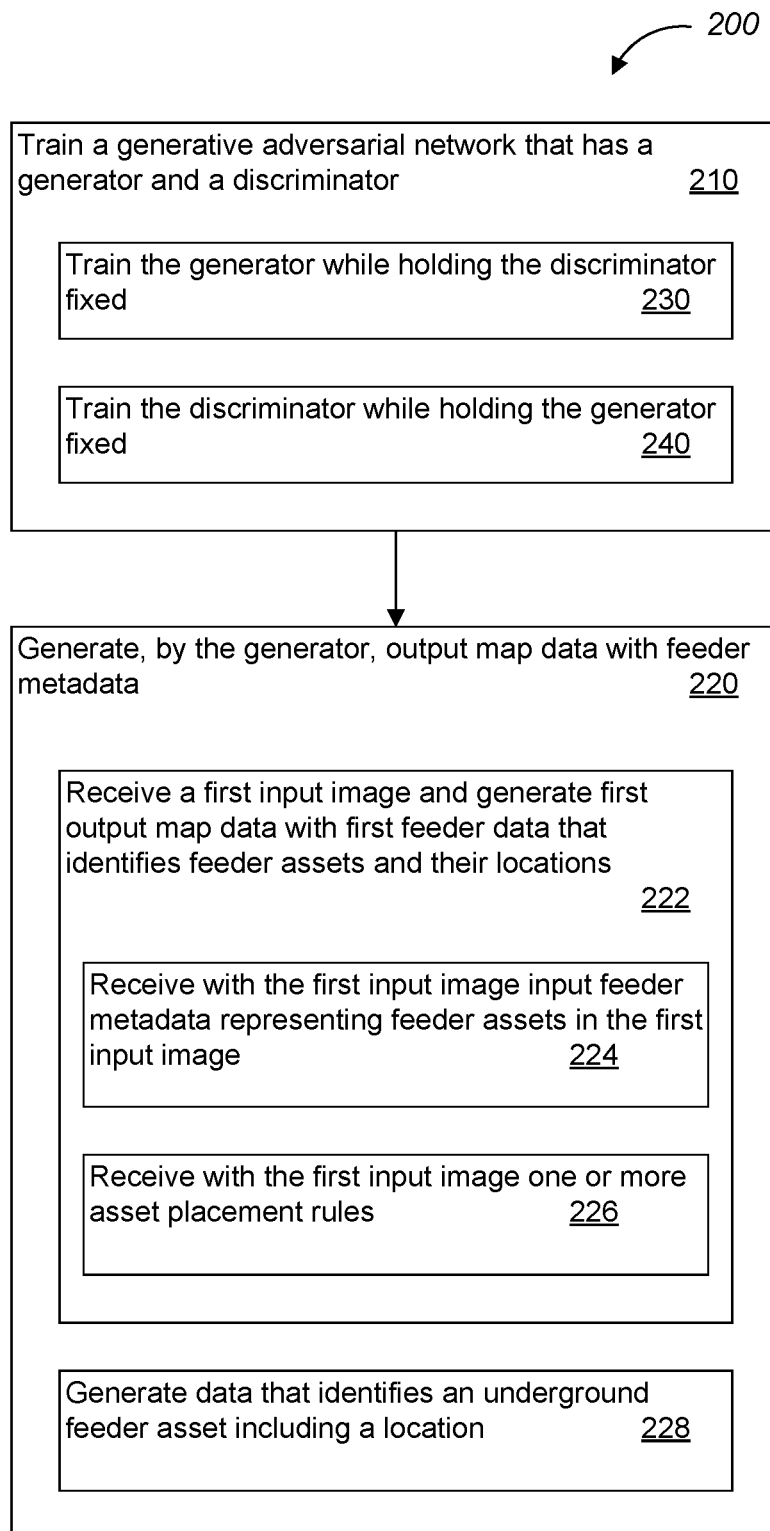
FIG. 2 is a flow chart of a method for using a neural network to predict locations of feeders in an electrical power grid.

FIG. 2 is a flow chart of a method 200 for using a neural network to predict locations of feeders in an electrical power grid.

The method includes training (210) a generative adversarial network that has a generator and a discriminator. The method includes generating (220), by the generator, from input map data including input images, output map data with feeder metadata that represents predicted locations of feeder assets, including receiving (222) by the generator a first input image and generating by the generator a corresponding first output map data with first feeder data that identifies one or more feeder assets and their respective locations, wherein the one or more feeder assets had not been identified in any input to the generator.

In some implementations, generating first output map data with first feeder data also includes receiving (224) with the first input image corresponding input feeder metadata representing one or more feeder assets in the first input image.

In some implementations, generating the first output map data with first feeder data also includes receiving (226) with the first input image one or more asset placement rules.

In some implementations, generating the first output map data includes generating (228), as first feeder data, data that identifies an underground feeder asset including a location of the underground feeder asset.

In some implementations, training the generative adversarial network includes training (230) the generator while holding the discriminator fixed, including (i) providing training input to the generator, the training input comprising training input map data, (ii) providing corresponding training outputs generated by the generator to the discriminator, the training outputs comprising map data including feeder metadata, and (iii) training the generator based on a respective discriminator output from the discriminator for each training output received by the discriminator.

In some implementations, training the generative adversarial network includes training (240) the discriminator while holding the generator fixed, including providing to the discriminator training output images generated by the generator and ground truth images, wherein the ground truth images provided to the discriminator each include respective ground truth feeder data identifying feeder assets and their locations on the ground truth images.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

In addition to the embodiments of the attached claims and the embodiments described above, the following numbered embodiments are also innovative:

Embodiment 1 is a method for using a neural network to predict locations of feeders in an electrical power grid, the method comprising:
training a generative adversarial network comprising a generator and a discriminator; and
generating, by the generator, from input map data including input images, output map data with feeder metadata that represents predicted locations of feeder assets, including receiving, by the generator, a first input image and generating by the generator a corresponding first output map data with first feeder data that identifies one or more feeder assets and their respective locations, wherein the one or more feeder assets had not been identified in any input to the generator.

Embodiment 2 is a method of embodiment 1, wherein generating first output map data with first feeder data comprises also receiving with the first input image corresponding input feeder metadata representing one or more feeder assets in the first input image.

Embodiment 3 is a method of any one of embodiments 1-2, wherein generating the first output map data with first feeder data comprises also receiving with the first input image one or more asset placement rules.

Embodiment 4 is a method of any one of embodiments 1-3, wherein: the respective feeder data is incorporated in a respective output image.

Embodiment 5 is a method of any one of embodiments 1-3, wherein: the respective feeder data is generated as metadata separate from an output image.

Embodiment 6 is a method of any one of embodiments 1-5, wherein generating the first output map data includes generating, as first feeder data, data that identifies an underground feeder asset including a location of the underground feeder asset.

Embodiment 7 is a method of any one of embodiments 1-6, wherein the first feeder data identifies all feeder assets between a particular substation and a particular load.

Embodiment 8 is a method of embodiment 7, wherein the particular load is a residential load.

Embodiment 9 is a method of any one of embodiments 1-8, wherein the one or more feeder assets comprise three or more of a line, a pole, a crossarm, a transformer, a switch, an insulator, a recloser, a sectionalizer, a capacitor bank, including switched capacitors, a load tap changer, or a tap.

Embodiment 10 is a method of embodiment 9, wherein the one or more feeder assets comprise a first transformer and the first feeder data specifies a size of the first transformer.

Embodiment 11 is a method of embodiment 9, wherein the one or more feeder assets comprise a first capacitor bank that includes switched capacitors.

Embodiment 12 is a method of any one of embodiments 1-11, wherein the generator and discriminator are each a respective convolutional neural network model.

Embodiment 13 is a method of any one of embodiments 1-12, wherein training the generative adversarial network comprises:
training the generator while holding the discriminator fixed, including
providing training input to the generator, the training input comprising training input map data, and
providing corresponding training outputs generated by the generator to the discriminator, the training outputs comprising map data including feeder metadata, and
training the generator based on a respective discriminator output from the discriminator for each training output received by the discriminator.

Embodiment 14 is a method of embodiment 13, wherein:
the training input includes, for a first plurality of training inputs, data representing respective identified above-ground feeder assets corresponding to training input images.

Embodiment 15 is a method of any one of embodiments 13-14, wherein:
the training input includes one or more asset placement rules.

Embodiment 16 is a method of any one of embodiments 1-15, wherein training the generative adversarial network comprises:
training the discriminator while holding the generator fixed, including providing to the discriminator training output images generated by the generator and ground truth images, wherein the ground truth images provided to the discriminator each include respective ground truth feeder data identifying feeder assets and their locations on the ground truth images.

Embodiment 17 is a system comprising one or more computers implementing the method of any one of embodiments 1-16.

Embodiment 18 is a computer storage medium encoded with a computer program, the program comprising instructions that are operable, when executed by data processing apparatus, to cause the data processing apparatus to perform the method of any one of embodiments 1-16.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. Also, rather than using a GAN to predict feeders, a recurrent neural network with a beam search could be used. The beam search would allow for possible next moves and the recurrent neural network would give the probabilities and locations of each feeder asset.

What is claimed is:

1. A method for using a neural network to predict locations of feeder assets in an electrical power grid, the method comprising:
    training a generative adversarial network comprising a generator and a discriminator, wherein training the generative adversarial network comprises:
        training the discriminator while holding the generator fixed, including providing to the discriminator training output images generated by the generator and ground truth images, wherein the ground truth images provided to the discriminator each include respective ground truth feeder data identifying the feeder assets and their locations on the ground truth images; and
    generating, by the generator, from input map data including input images, output map data with feeder metadata that represents predicted locations of feeder assets, including receiving, by the generator, a first input image and generating by the generator corresponding first output map data with first feeder data that identifies one or more feeder assets and their respective locations, wherein the one or more feeder assets had not been identified in any input to the generator.

2. The method of claim 1, wherein generating first output map data with first feeder data comprises also receiving with the first input image corresponding input feeder metadata representing one or more feeder assets in the first input image.

3. The method of claim 2, wherein generating the first output map data with first feeder data comprises also receiving with the first input image one or more asset placement rules.

4. The method of claim 3, wherein:
    the respective feeder data is incorporated in a respective output image.

5. The method of claim 3, wherein:
    the respective feeder data is generated as metadata separate from an output image.

6. The method of claim 1, wherein generating the first output map data includes generating, as first feeder data, data that identifies an underground feeder asset including a location of the underground feeder asset.

7. The method of claim 6, wherein the first feeder data identifies all feeder assets between a particular substation and a particular load.

8. The method of claim 7, wherein the particular load is a residential load.

9. The method of claim 8, wherein the one or more feeder assets comprise three or more of a line, a pole, a crossarm, a transformer, a switch, an insulator, a recloser, a sectionalizer, a capacitor bank, including switched capacitors, a load tap changer, or a tap.

10. The method of claim 9, wherein the one or more feeder assets comprise a first transformer and the first feeder data specifies a size of the first transformer.

11. The method of claim 9, wherein the one or more feeder assets comprise a first capacitor bank that includes switched capacitors.

12. A system comprising one or more computers configured to perform operations comprising:
    training a generative adversarial network comprising a generator and a discriminator; and
    generating, by the generator, from input map data including input images, output map data with feeder metadata that represents predicted locations of feeder assets, including receiving, by the generator, a first input image and generating by the generator corresponding first output map data with first feeder data that identifies one or more feeder assets and their respective locations, wherein the one or more feeder assets had not been identified in any input to the generator.

13. The method of claim 1, wherein the generator and discriminator are each a respective convolutional neural network model.

14. The system of claim 12, wherein the particular load is a residential load;
    wherein the one or more feeder assets comprise three or more of a line, a pole, a crossarm, a transformer, a switch, an insulator, a recloser, a sectionalizer, a capacitor bank, including switched capacitors, a load tap changer, or a tap;
    wherein the one or more feeder assets comprise a first transformer and the first feeder data specifies a size of the first transformer; and
    wherein the one or more feeder assets comprise a first capacitor bank that includes switched capacitors.

15. The system of claim 12, wherein generating first output map data with first feeder data comprises also receiving with the first input image corresponding input feeder metadata representing one or more feeder assets in the first input image.

16. The system of claim 15, wherein generating the first output map data with first feeder data comprises also receiving with the first input image one or more asset placement rules.

17. The system of claim 16, wherein:
    the respective feeder data is incorporated in a respective output image, and the respective feeder data is generated as metadata separate from an output image.

18. The system of claim 12, wherein generating the first output map data includes generating, as first feeder data, data that identifies an underground feeder asset including a location of the underground feeder asset.

19. The system of claim 18, wherein the first feeder data identifies all feeder assets between a particular substation and a particular load.

\* \* \* \* \*